United States Patent [19]
Rehman et al.

[11] Patent Number: 6,004,050
[45] Date of Patent: Dec. 21, 1999

[54] CARRIAGE SCANNING SYSTEM WITH CARRIAGE ISOLATED FROM HIGH FREQUENCY VIBRATIONS IN DRIVE BELT

[75] Inventors: David Rehman; Tod S. Heiles, both of Vancouver; Geoff Wotton, Battleground; John Sturman, Vancouver, all of Wash.

[73] Assignee: Hewlett-Packard, Palo Alto, Calif.

[21] Appl. No.: 08/995,773

[22] Filed: Dec. 22, 1997

[51] Int. Cl.⁶ .................................................. B41J 25/304
[52] U.S. Cl. .......................................... 400/319; 400/320
[58] Field of Search .................... 400/319, 320, 400/328

[56] References Cited

U.S. PATENT DOCUMENTS

| | | | |
|---|---|---|---|
| 4,050,568 | 9/1977 | Davies et al. | 197/90 |
| 4,084,681 | 4/1978 | Heinzl et al. | 74/37 |
| 4,976,556 | 12/1990 | Longrod | 400/305 |
| 5,391,867 | 2/1995 | Grumberg | 250/208.1 |
| 5,595,448 | 1/1997 | Harada et al. | 400/320 |
| 5,663,806 | 9/1997 | Grise et al. | 358/406 |

*Primary Examiner*—John Hilten

[57] ABSTRACT

A carriage drive system includes a carriage driven along a carriage path under a force generated by a drive motor. The driving force is coupled to the carriage by a drive belt. High frequency vibrations occurring in the drive belt are isolated from the carriage to improve print quality or scanning accuracy. Vibrations are introduced to the drive belt by the drive motor, the connection between the drive motor and the drive belt or from another source. High frequency decoupling is achieved using a spring connection which serves as a low pass filter of vibration frequencies. In addition, a linear encoder is included on the carriage for detecting carriage position. Such linear encoder samples carriage position at a rate fast enough to enable compensation for low frequency carriage vibrations.

18 Claims, 6 Drawing Sheets

CARRIAGE SCANNING SYSTEM WITH CARRIAGE ISOLATED FROM HIGH FREQUENCY VIBRATIONS IN DRIVE BELT

BACKGROUND OF THE INVENTION

This invention relates generally to carriage drive systems for printing and scanning devices, and more particularly, to an apparatus and method for reducing vibrations of a carriage during movement along a carriage path.

In inkjet printing systems and document scanning systems a carriage is moved relative to a media to either print or scan the media. In an inkjet printing system, the carriage carries an inkjet pen which ejects ink drops onto the media as the media is moved along a media path. In a document scanning system the carriage carries an optical sensor which detects ink markings or characters on the media as the carriage moves relative to the media. To achieve accurate printing or scanning, it is important to know or maintain an accurate positional relationship between the carriage and the media.

Figure 1:
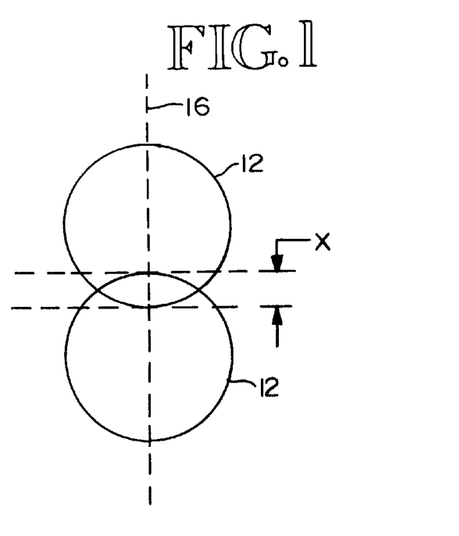
FIG. 1 a diagram of inkjet printing dots of a first size having a given overlap.
Figure 2:
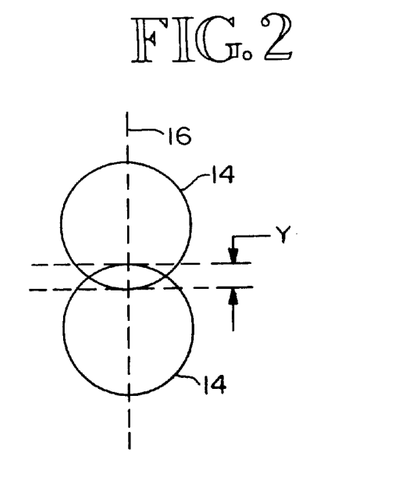
FIG. 2 is a diagram of inkjet printing dots of a second size smaller than the first size and having e percentage of overlap.

In inkjet printing it is important that the carriage scan the inkjet pen smoothly across the media with minimum vibration so that ink dots can be accurately placed. Conventional inkjet printers print 300 dots per inch or 600 dots per inch. In addition, printers which print at 1200 dots per inch are being sought. As the number of dots per inch increase, the dot size has decreased. Precise dot positioning of the smaller dots at increasing dot density leads to higher quality images. In particular, such positioning of colored dots is leading to near photographic image quality. One challenge in striving to achieve such improved image quality is the adverse impact of carriage vibrations. FIG. 1 shows two overlapping circles 12 having a common first size. Each circle 12 represents an inkjet printing dot of a first size. Such size is largely exaggerated here for purposes of illustration. FIG. 2 shows two overlapping circles 14 having a common second size which is smaller than the first size. Again, each circle 14 represents an inkjet printing dot of a second size, and such size is largely exaggerated for purposes of illustration. In each example, the dots 12 and dots 14 overlap by a common percentage of their respective diameters (e.g., 20%). The absolute distance of overlap is larger for the larger dots 12 than for the dots 14. The overlap of dots 12 is a distance x. The overlap of dots 14 is a distance y. For purposes of illustration, assume that dots 14 are half the size of dots 12 and that y=0.5x.

Figure 3:
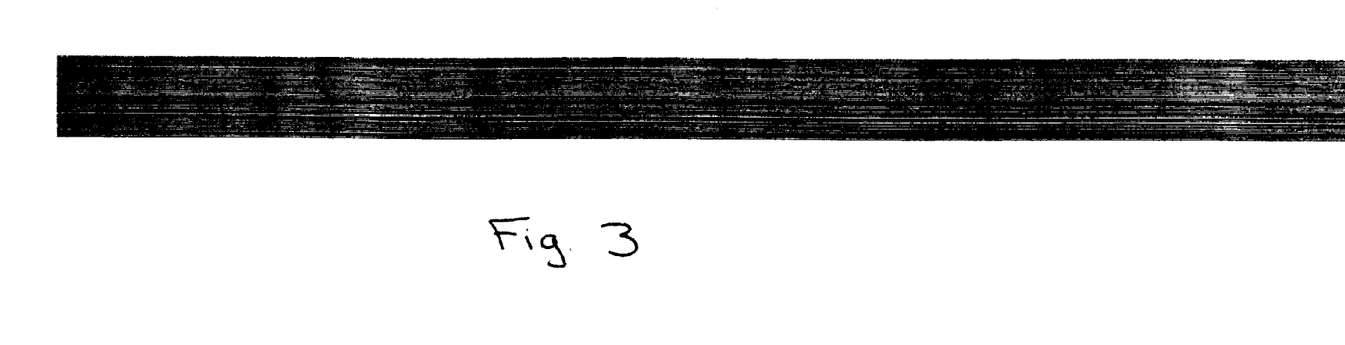
FIG. 3 is a copy of an image which exhibits banding due to vibrations of a carriage relative to a meda sheet within an inkjet printing system.

Consider now a situation where the carriage vibrates during printing along an axis 16. If the vibration amplitude along axis 16 is much smaller than the distance x, then the impacts of the vibration will not adversely impact the dot placement accuracy, and thus not adversely image the image quality. As the vibration amplitude along axis 16 approaches the distance x, however, more white space occurs on the media in the vicinity of the dots 12 intersection. Taken over an entire image, the effect appears as a banding of lighter and darker areas of the image. FIG. 3 shows an exemplary image 18 exhibiting such banding.

Given the same amount of vibration amplitude, the impact to an image formed of the smaller dots 14 is more adverse than to an image formed with the dots 12. For example, a vibration amplitude of 0.25x may be acceptable for printing using dots 12. The same vibration amplitude equals 0.5y and may cause unacceptable banding when printing with the dots 14. Such bands occur within an image at the frequency of vibration of the carriage along the axis 16. In general, the smaller dot size and higher resolution of advancing ink jet printers require more accurate placement of dots to achieve expected image quality improvements.

Any vibrations displacing the carriage relative to the media can potentially reduce printing/scanning accuracy. Typical sources of vibration are external vibrations which move the whole printer or scanner, and internal sources which are coupled to the carriage or media. This invention is directed toward internal vibrations which are coupled to the carriage. Efforts to reduce the impact of the vibrations have included reducing the magnitude of the vibrations generated by the drive system. This is achieved, for example, by using a smoother running carriage motor or by achieving more accurate meshing of teeth between drive belt and motor. Another approach is to stiffen the carriage system (i.e., increase the resonant frequency of the carriage and carriage rod so that the vibrations have less impact on the carriage). This is achieved, for example, by increasing precision of the carriage bearing, increasing the size of the carriage, or increasing diameter of the carriage rod. All of these solutions add significant expense to the system. Accordingly, there is need for a relatively low cost, yet effective solution for eliminating or reducing the carriage vibrations or the impact of such vibrations.

SUMMARY OF THE INVENTION

According to the invention, vibrations occurring in a drive belt of a carriage drive system are isolated from a carriage driven by such system. The carriage drive system includes a carriage driven along a carriage path under a force generated by a drive motor. The force is coupled to the carriage by the drive belt. Vibrations are introduced to the drive belt by the drive motor, the connection between the drive motor and the drive belt or from another source.

According to an aspect of this invention, high frequency vibrations in the drive belt are decoupled from the carriage. Such high frequency decoupling or isolation is achieved using a spring connection. All forces exerted on the carriage through the drive belt are passed through the spring connection. Such spring connection serves, in effect, as a low pass filter of vibration frequencies. Vibration frequencies above a prescribed frequency determined by the spring connection are absorbed by the spring, and thus, are filtered out. Vibrations below such frequency pass to the carriage. The spring constants are selected so that vibrations at frequencies that are at least 95% of the natural resonant frequency of the fully loaded carriage are filtered out. Preferably, the spring constants define the prescribed frequency to be a value within the range of 50% to 95% of the natural resonant frequency of the fully loaded carriage. Vibrations at frequencies above such prescribed frequency value are filtered out by the spring connections.

According to another aspect of this invention, detection of the carriage position is independent of the drive motor rotation. To accurately place dots on a media sheet or to accurately detect the position of characters on a media sheet, the position of the carriage is monitored and controlled. A linear encoder is included on the carriage for detecting carriage position. Such linear encoder samples carriage position at a rate fast enough to compensate for low frequency carriage vibrations.

Low frequency vibrations passed to the carriage cause low frequency carriage vibrations. The relative displacements of the carriage during the course of a scan caused by such low frequency vibrations are detected by the linear encoder. Dot ejection times or character sampling times are adjusted to account for such displacements so as to accurately place a dot (e.g., during printing) or detect a character (e.g., during scanning).

The linear encoder enables low frequency vibration compensation. The spring connection provides high frequency vibration isolation. Such isolation is for vibration force components occurring along the axis of the scan path. Vibration force components occurring along axes orthogonal to the scan path are not problematic due to the stiffness of the carriage and a carriage rod along which the carriage moves. Vibrations in such orthogonal directions would tend to force the carriage in a direction perpendicular to the carriage rod. There is insufficient play in the connection between carriage and carriage rod for such vibration components to adversely impact printing.

One advantage of the invention is that vibrations in the drive belt of a carriage drive system are isolated from the carriage. Such vibration isolation effectively reduces adverse vibrational challenges more inexpensively than solutions which decrease the sources of vibration generated within a printer or scanning system. Another advantage is that a linear encoder used for sensing carriage position accounts for low frequency vibrations of the carriage not filtered out by the vibration isolator. The benefit is that print quality is improved for printers with decreasing dot size and increasing precision. These and other aspects and advantages of the invention will be better understood by reference to the following detailed description taken in conjunction with the accompanying drawings.

DESCRIPTION OF SPECIFIC EMBODIMENTS

Figure 4:
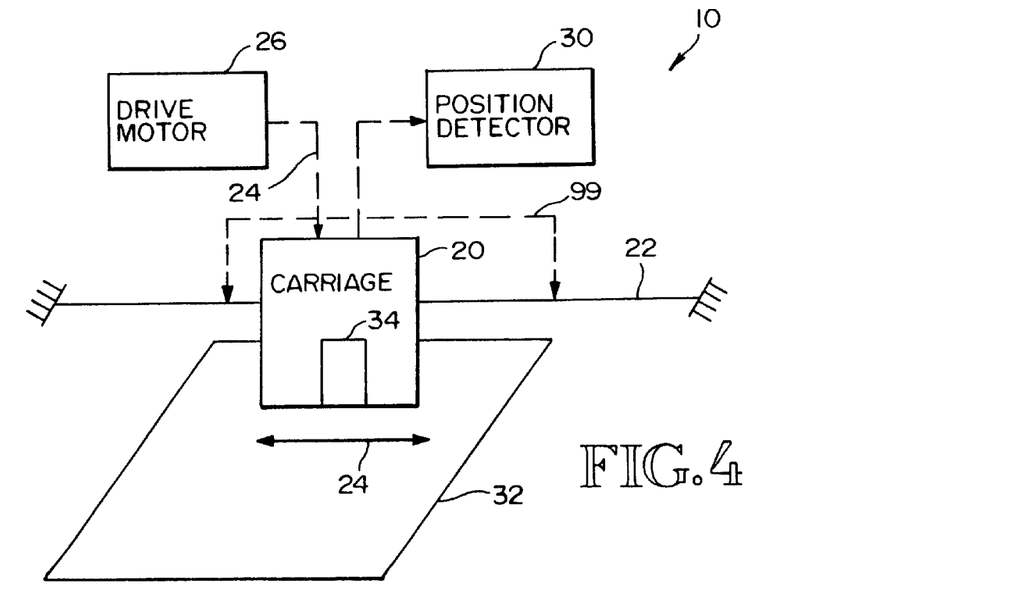
FIG. 4 is a block diagram of a carriage drive system.

FIG. 4 shows a carriage drive system 10 having a carriage 20 driven along a carriage path 22 under a drive force 24 generated by a drive motor 26. As the carriage is driven back and forth in directions 58, 60, the carriage position along the carriage path 22 is monitored by a position detector 30 (e.g., linear encoder). The position detector 30 provides feedback of the carriage position for accurately controlling the movement of the carriage 20 relative to a media 32. The carriage carries a device 34 which acts upon the media 32.

In an inkjet printing apparatus embodiment, the device 34 is one or more inkjet pens. The inkjet pen includes a pen body with an internal reservoir and a printhead. The printhead includes an array of printing elements. For a thermal inkjet printhead, each printing element includes a nozzle chamber, a firing resistor and a nozzle opening. Ink flow from the reservoir into the nozzle chambers, then is heated by activation of the firing resistor. A vapor bubble forms in the nozzle chamber which forces an ink drop to be ejected through the nozzle opening ont the media Precise control of the ink drop ejection and the relative position of the inkjet pen and media enable formation of characters, symbols and images on the media.

In a document scanning apparatus embodiment the device 34 carried by the carriage 20 is one or more optical sensors and the media is a document having markings (e.g., characters, symbols or images). As the carriage moves relative to the document, the optical sensor detects the markings on the document. Precise control of the optical sensor position relative to the document enables an electronic image of the document to be generated. In character recognition systems, softvare is included which recognizes given marking patterns as given alphanumeric characters.

Figure 5:
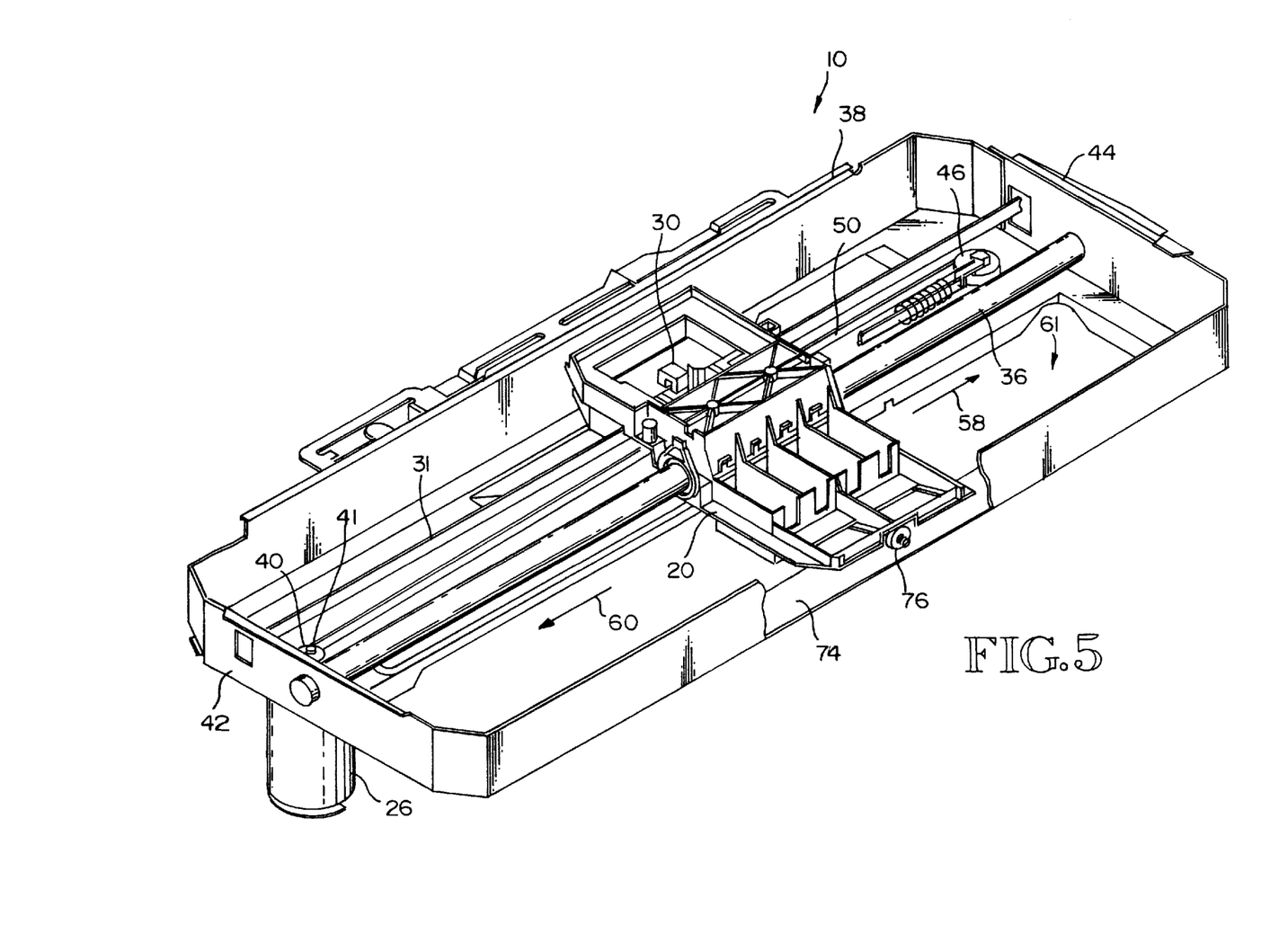
FIG. 5 is a perspective view of a carriage drive system for an inkjet printing system according to an embodiment of this invention.
Figure 6:
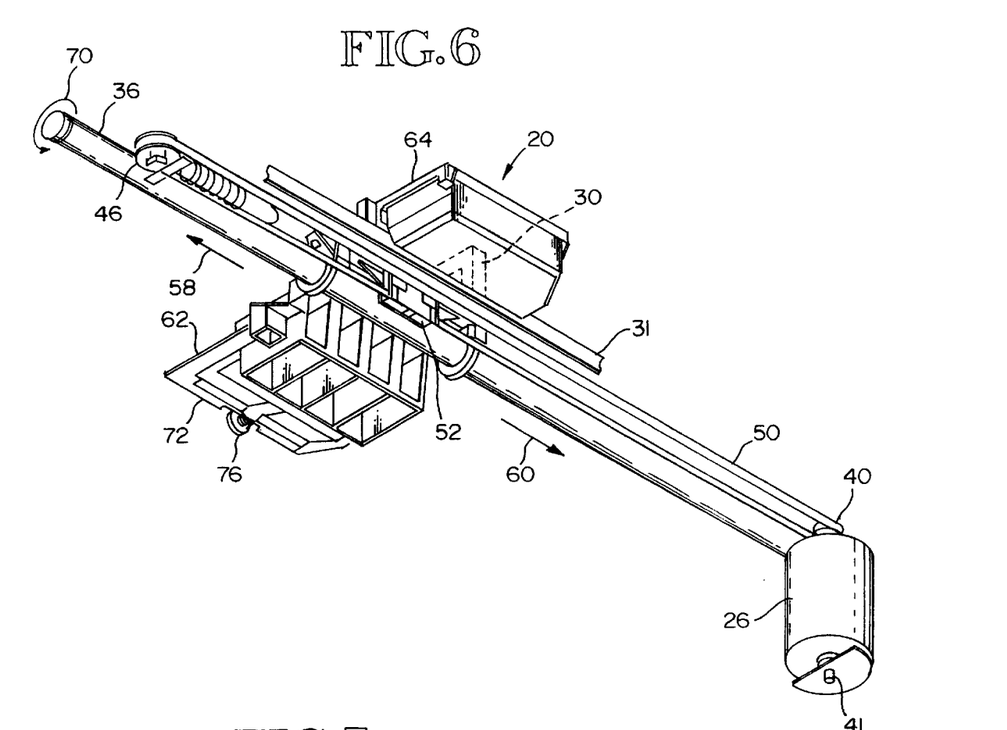
FIG. 6 is a perspective view of a portion of the carriage drive system of FIG. 5.

FIGS. 5 and 6 show a perspective view of the carriage drive system 10 according to an embodiment of this invention. The carriage 20 is driven along a carriage rod 36. The carriage rod is mounted to a carriage plate 38. The carriage plate 38 serves as a frame for the carriage drive system 10. The drive motor 26 is mounted to the carriage plate 38. The drive motor 26 includes a rotating shaft 41 upon which a pulley 40 is mounted. The motor 26 and pulley 40 are located toward one end 42 of the drive plate. Toward an opposite end 44 a spring-loaded pulley 46 is mounted. A drive belt 50 runs along the pulleys 40, 46 and is held in tension by the spring-loaded pulley 46. The drive belt 50 is connected to the carriage 20 through a spring connection 52 so as to couple the drive force generated by the motor 26 to the carriage 20. As the motor 26 rotates its shaft, the drive belt runs along the pulleys 40, 46 causing the carriage to move first in one direction 58, then back in the opposite direction 60 along the carriage rod 36. The carriage plate 38 includes an opening 61 which exposes a portion of the carriage to an underlying media. Such carriage portion carries the device 34 (e.g., inkjet pen or document scanner sensor).

The carriage 20 carries a device 34 (see FIG. 3) for printing or scanning a media. The carriage 20 also carries a linear encoder module 30. A linear encoder strip 31 is fixed relative to the carriage plate 38. The strip 31 includes evenly spaced markings. The linear encoder module 30 includes an optical sensor which detects and counts such markings so as to track the location of the carriage 20 relative to the strip 31. Because the strip 31 and carriage rod 36 are fixed relative to the carriage plate 38, the linear encoder module 30 is able to detect the carriage position relative to the linear encoder strip 31, the carriage plate 38 and the carriage rod 36.

Figure 7:
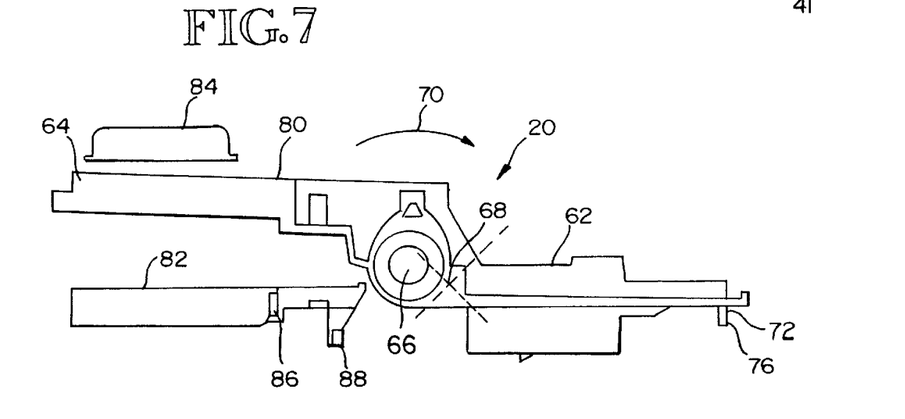
FIG. 7 is an exploded planar view of the carriage of FIGS. 5 and 6.

FIG. 7 shows an exploded view of the carriage 20 for an inkjet printing embodiment. The carriage is formed by a first member 80, a second member 82 and a cap member 84. The second member 82 and cap member 84 are attached to the first member 80. The first member 80 includes a first portion 62 for carrying an inkjet pen device 34 (see FIG. 1) and a second portion 64 for receiving the second member 82 and cap member 84. The second member 82 houses the linear encoder module and other electronic circuitry (e.g., print control circuitry, print memory). The second member 82 includes a slot 86 through which the linear encoder strip 31 runs during movement of the carriage 20. The second member 82 also includes the spring connection 88 which couples the carriage 20 to the drive belt 50. The cap member 84 covers the linear encoder module 30 and electronic circuitry.

The first member 80 includes an opening 66 which extends through a center area and receives the carriage rod 36. With the pen(s) loaded and the electronic circuitry mounted, the center of gravity 68 of the carriage 20 is located slightly forward and down of the opening 66 center point toward the first portion 62. Thus, as the carriage 20 moves along the carriage rod 36 there is a moment arm 70 about the carriage rod 36 which biases a distal end 72 of the carriage 20 toward a first surface 74 of the carriage plate 38. A roller 76 is mounted to the carriage 20 first portion 62 toward the distal end 72. Under the gravitational force of the moment arm 70, the roller 76 resides in contact with the carriage plate first surface 74. As the carriage 20 moves along the carriage rod 36, the roller 76 runs along the first surface 74. The first surface 74 is in effect a track for the roller 76. Referring to FIG. 5, a portion of the carriage plate 38 is shown in cut-away view to reveal the roller 76 and first surface 74. In an alternative embodiment the roller 76 is a sled or ski.

Isolation of Carriage from Drive Belt Vibrations

Figure 8:
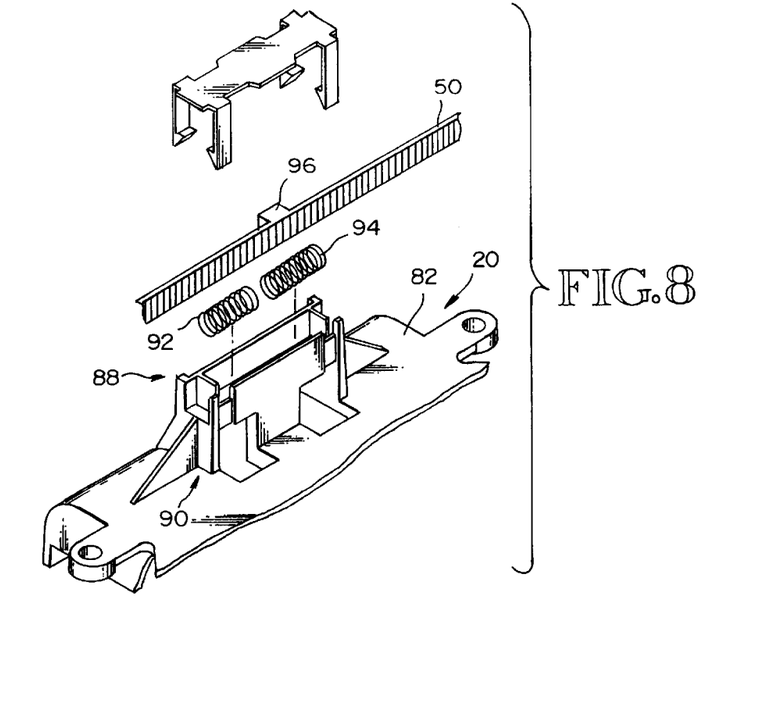
FIG. 8 is an exploded view of the spring connection between the drive belt and carriage of FIG. 5–7.
Figure 9:
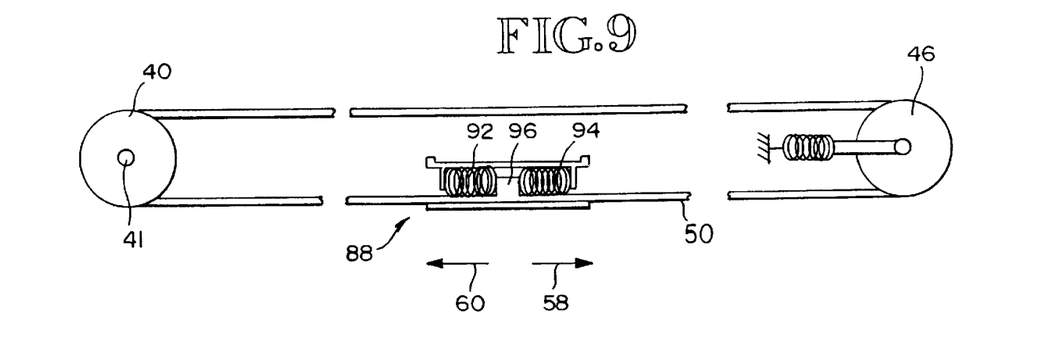
FIG. 9 a diagram of the spring connection of FIG. 8.

The carriage 20 includes a spring connection 88 for isolating the carriage 20 from high frequency vibrations occurring in the drive belt 50. FIGS. 8 and 9 shows the spring connection 88 and the drive belt 50. The carriage 20 second member 82 includes a housing region 90 defining an enclosure for a first spring 92 and a second spring 94. The drive belt 50 includes a block protrusion 96. The block protrusion 96 of the belt 50 is positioned within the housing region 90 with the first spring 92 and second spring 94 located to each side of the block protrusion 96 along the direction of the drive belt 50. A cap 98 covers the housing region 90 to keep the springs 92, 94 in place.

As the motor 26 generates the drive force 24 to move the carriage 20 along the carriage rod 36, the drive force is transmitted to the carriage through the spring connection 88. For motion in the direction 58, the spring 94 is biased by the drive force toward compression and the spring 92 is biased toward relaxation relative to the spring states when there is no drive force present. For motion in the direction 60 the spring 92 is compressed in part by the drive force and the spring 94 is biased toward relaxation relative to the spring states when there is no drive force present. The spring constants are selected so that the springs 92, 94 are not fully compressed or fully relaxed during movement of the carriage along at least a prescribed region 99 of the carriage path 22 (see FIG. 4). Such prescribed region 99 corresponds to the region during which the carried device 34 is over the media 32.

Typically a constant drive force is applied during movement of the carriage in one direction. The force then diminishes and reverses to move the carriage in the other direction. The back and forth motion of the carriage occurs at a first frequency which defines the frequency of change for the drive force. Vibrations are coupled onto the drive belt 50 inadvertently, however. These vibrations generally occur over a range of frequencies extending much higher than the first frequency. As described in the background section, the vibrations can have adverse impacts on the print quality of a printing system or the scan quality of a scanning system. The spring connection 88 serves as a low pass filter which absorbs the high frequency vibrations and pass the low frequency vibrations (e.g., the drive force first frequency).

The range of high frequency vibrations absorbed depends on the spring constants of the springs 92, 94. Such spring constants are selected so as to filter out vibrations at frequencies which are at least 95% of the natural resonant frequency of the fully loaded carriage (i.e., the carriage 20 with device 34 and any other circuits or components mounted to or carried by the carriage 20). Preferably, the springs constants are selected so as to filter out vibrations at frequencies which are at least 50% of the natural resonant frequency of the fully-loaded carriage. The term high frequency vibration as used herein means vibrations occurring at frequencies which are at least a prescribed frequency value. Such prescribed frequency value is determined by the spring constants. In various embodiments the spring constants are selected to define a prescribed frequency which is some value within the range of 50%–95% of the natural resonant frequency of the fully-loaded carriage.

Low frequency vibrations which are not filtered out by the spring connection 88 are compensated for by the linear encoder module 30. The linear encoder serves to detect carriage position. Carriage position is monitored so that ink dots can be accurately placed on a media sheet or markings can be accurately detected. By mounting the linear encoder onto the carriage, the linear encoder detects carriage position independently of the motor shaft 41 rotation. As a result, vibrations in the motor shaft are not coupled into the position detection scheme. Thus, the linear encoder is able to detect the carriage position even in the presence of carriage vibrations. Such vibrations move the linear encoder module 30 relative to the linear encoder strip 31. Thus carriage position is detected during portion of a vibration period. More specifically though, low frequency vibrations occurring at a frequency less than the sampling rate of the linear encoder and of an amplitude detectable by the linear encoder are detected by the linear encoder. Such vibrations are in effect compensated for by adjusting the timing of ink drop ejections or optical sensor scanning to accurately perform the printing or scanning function.

Thus, the linear encoder 30 enables low frequency vibration compensation, while the spring connection provides high frequency vibration isolation. Such high frequency isolation is for vibration force components occurring along the axis of the scan path. Vibration force components occurring along axes orthogonal to the scan path 22 are not problematic due to the stiffness of the carriage and a carriage rod along which the carriage moves. Vibrations in such orthogonal directions would tend to force the carriage in a direction perpendicular to the carriage rod 36. There is insufficient play in the connection between carriage 20 and carriage rod 36 for such vibration components to adversely impact printing.

Isolation of Carriage from Rotational Vibrations

As described above, there is a moment arm 70 of the carriage 20 about the carriage rod 36 during movement of the carriage 20 along the carriage rod 36 (see FIGS. 6 and 7). Such moment arm 70 biases the distal end 72 of the carriage 20 toward the first surface 74 of the carriage plate 38. Referring to FIGS. 5 and 10–12 there is a roller 76 mounted to the carriage 20 first portion 62 toward the distal end 72. Under the gravitational force of the moment arm 70, the roller 76 resides in contact with the carriage plate first surface 74. As the carriage 20 moves along the carriage rod 36, the roller 76 runs along the first surface 74.

Figure 10:
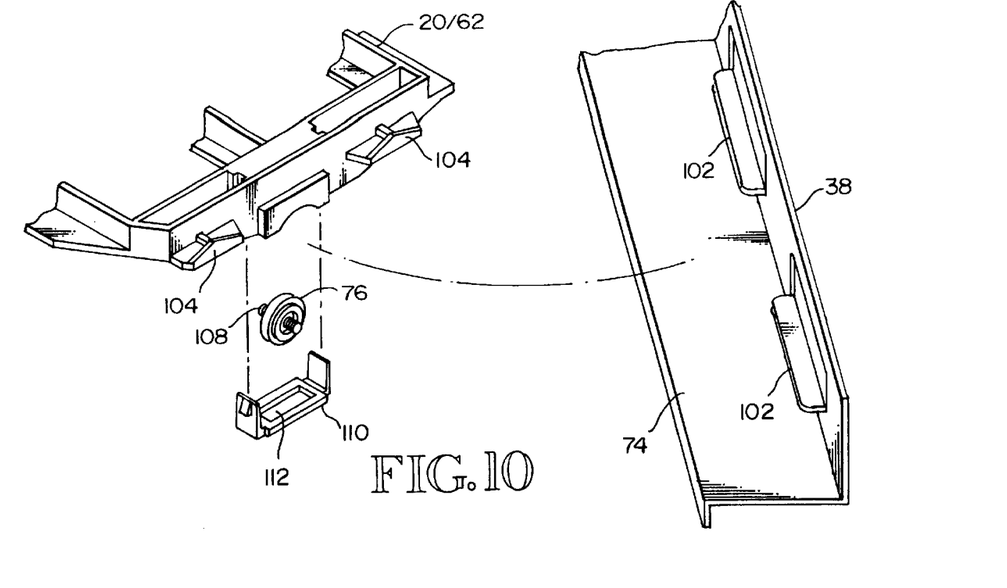
FIG. 10 is a partial exploded view of a carriage roller to carriage plate contact region.
Figure 11:
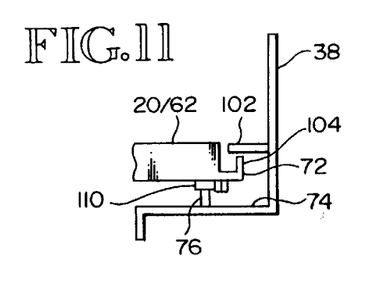
FIG. 11 is a diagram of carriage roller to carriage plate contact.
Figure 12:
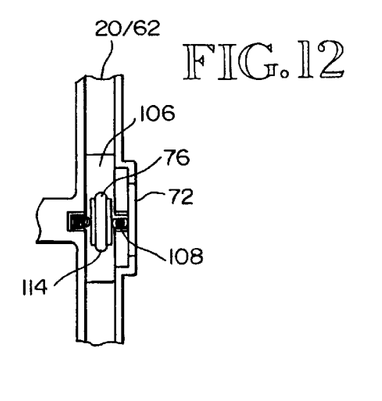
FIG. 12 is a plane view of the roller of FIG. 10 residing within a recess of the carriage.

Referring to FIGS. 10 and 11, the carriage plate 38 defines upper bumpers 102 which block rotation of the carriage 20 away from the first surface 74. The distal end 72 of the carriage 20 includes a rail 104 which underlies the bumpers 102 during movement of the carriage 20. The roller 76 sits within a recess 106 of the carriage 20 adjacent the distal end 72. In a preferred embodiment the roller axle is a tuned spring 108. A cover 110 having an opening 112 holds the roller 76 within the recess 106. The roller protrudes through the opening 112 into contact with the carriage plate first surface 74.

The tuned spring 108 serves as a vibration isolator for isolating the carriage 20 from vibrations caused by the roller 76 motion and from vibrations coupled into the roller 76. The roller 76 introduces vibrations, for example, if it is not precisely round (e.g., bumps or flat spots along the periphery of the roller). The roller also introduces vibrations when the axle is not precisely centered. In addition, the track introduces vibrations by not being smooth. As the roller moves along the track bumps in the track cause vibrations. The spring is tuned and by tuned it is meant that the spring constant is prescribed such that the spring absorbs vibrations occurring above a given frequency. The preferred spring constant is determined empirically based upon testing of rollers and tracks manufactured at given tolerances. Springs of different spring constants are tried in efforts to have a find a tuned spring leading to acceptable print quality. It is known that zero defect rollers and smoother tracks will lessen the rotational vibrations. By, alternatively or in addition, performing vibration isolation with a tuned spring, fewer vibrations are introduced to the carriage. Thus, print quality or scanning reliability is improved.

The roller 76 has a peripheral surface 114 which serves as a running surface making contact with the carriage plate first surface 74. In an alternative embodiment the roller 76 is replaced by a sled or ski. In such alternative embodiments the sled or ski also include a running surface which makes contact with the carriage plate first surface 74.

Figure 13:
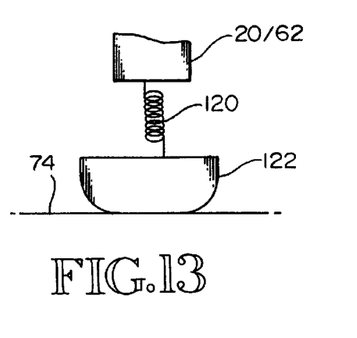
FIG. 13 is a diagram of an alternative vibration isolation structure at the carriage to carriage plate contact.
Figure 14:
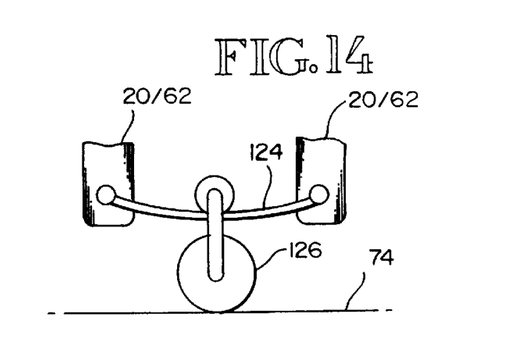
FIG. 14 is a diagram of another alternative vibration isolation structure at the carriage to carriage plate contact.

In alternative embodiments the vibration isolator is implemented as a suspension for the roller 76 or a sled or ski. FIGS. 13 shows a spring suspension 120 for a sled or ski 122. FIG. 14 shows a leaf spring suspension 124 for a roller, sled or ski 126.

Meritorious and Advantageous Effects

One advantage of the invention is that vibrations in the drive belt of a carriage drive system are isolated from the carriage. Such vibration isolation effectively reduces adverse vibrational challenges more inexpensively than solutions which decrease the sources of vibration generated within a printer or scanning system. Another advantage is that a linear encoder used for sensing carriage position accounts for low frequency vibrations of the carriage not filtered out by the vibration isolator. The benefit is that print quality is improved for printers with decreasing dot size and increasing precision.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A carriage scanning system, comprising:
   a carriage which moves along a carriage path;
   a spring mounted to the carriage;
   a drive motor which generates a drive force;
   a drive belt coupled to the drive motor and the spring, the spring serving as a link which elastically couples the drive belt to the carriage, the drive belt coupling the drive force to the carriage through the spring to cause the carriage to move along the carriage path; and
   means for isolating the carriage from vibrations occurring within the drive belt, the isolating means comprising the spring.

2. The system of claim 1, wherein the spring is a low pass filter of mechanical vibrations which filters out frequencies greater than a prescribed frequency.

3. The system of claim 1, wherein the carriage has a natural resonant frequency and wherein the spring has a spring constant prescribed to isolate the carriage from vibrations in the drive belt which have a frequency that are at least 95% of the carriage natural resonant frequency.

4. The system of claim 3, wherein the carriage has a natural resonant frequency and wherein the spring has a spring constant prescribed to isolate the carriage from vibrations in the drive belt which have a frequency that are at least 50% of the carriage natural resonant frequency.

5. The system of claim 1, wherein the drive belt includes a protrusion, and wherein the spring is located in contact with the protrusion, and wherein the drive force is coupled to the carriage from the drive belt through the contact between the protrusion and the spring.

6. A carriage scanning system, comprising:
   a carriage which moves along a carriage path;
   a first spring and a second spring mounted to the carriage;
   a drive motor which generates a drive force; and
   a drive belt which is coupled to the drive motor and which is elastically coupled to the carriage through the first spring and the second spring, the drive belt coupling the drive force to the carriage to cause the carriage to move along the carriage path, wherein the drive belt includes a protrusion, and wherein the first spring and second spring are in contact with the protrusion;
   wherein the first spring and second spring isolate the carriage from vibrations occurring within the drive belt.

7. The system of claim 6, wherein the first spring is a low pass filter of mechanical vibrations which filters out frequencies greater than a prescribed frequency.

8. The system of claim 7, wherein the carriage has a natural resonant frequency and wherein the first spring and the second spring each have a spring constant prescribed to isolate the carriage from vibrations in the drive belt which have a frequency that are at least 95% of the carriage natural resonant frequency.

9. An inkjet printing system for printing to a media sheet, comprising:
   a frame;
   a carriage rod mounted to the frame;
   a carriage which moves along the carriage rod;
   an inkjet pen mounted within the carriage for ejecting ink drops during movement of the carriage along the carriage rod;
   a spring mounted to the carriage;
   a drive motor which generates a drive force;
   a drive belt coupled to the drive motor and the spring, the spring serving as a link which elastically couples the drive belt to the carriage, the drive belt coupling the drive force to the carriage through the spring to cause the carriage to move along the carriage path; and means for isolating the carriage from vibrations occurring within the drive belt, the isolating means comprising the spring.

10. The system of claim 9, wherein the spring is a low pass filter of mechanical vibrations which filters out frequencies greater than a prescribed frequency.

11. The system of claim 9, wherein the carriage has a natural resonant frequency and wherein the spring has a spring constant prescribed to isolate the carriage from vibrations in the drive belt which have a frequency that are at least 95% of the carriage natural resonant frequency.

12. The system of claim 11, wherein the carriage has a natural resonant frequency and wherein the spring has a spring constant prescribed to isolate the carriage from vibrations in the drive belt which have a frequency that are at least 50% of the carriage natural resonant frequency.

13. The system of claim 9, wherein the drive belt includes a protrusion, and wherein the spring is located in contact with the protrusion, and wherein the drive force is coupled to the carriage from the drive belt through the contact between the protrusion and the spring.

14. A document scanning system, comprising:

a frame;

a carriage rod mounted to the frame;

a carriage which moves along the carriage rod;

an optical sensor mounted to the carriage for scanning a document during movement of the carriage along the carriage rod;

a spring mounted to the carriage;

a drive motor which generates a drive force;

a drive belt coupled to the drive motor and the spring, the spring serving as a link which elastically couples the drive belt to the carriage, the drive belt coupling the drive force to the carriage through the spring to cause the carriage to move along the carriage path; and means for isolating the carriage from vibrations occurring within the drive belt, the isolating means comprising the spring.

15. The system of claim 14, wherein the spring is a low pass filter of mechanical vibrations which filters out frequencies greater than a prescribed frequency.

16. The system of claim 14, wherein the carriage has a natural resonant frequency and wherein the spring has a spring constant prescribed to isolate the carriage from vibrations in the drive belt which have a frequency that are at least 95% of the carriage natural resonant frequency.

17. The system of claim 16, wherein the carriage has a natural resonant frequency and wherein the spring has a spring constant prescribed to isolate the carriage from vibrations in the drive belt which have a frequency that are at least 50% of the carriage natural resonant frequency.

18. The system of claim 14, wherein the drive belt includes a protrusion, and wherein the spring is located in contact with the protrusion, and wherein the drive force is coupled to the carriage from the drive belt through the contact between the protrusion and the spring.

* * * * *